US011639252B2

(12) United States Patent
Valderrama et al.

(10) Patent No.: US 11,639,252 B2
(45) Date of Patent: May 2, 2023

(54) CONTAINER WITH VENTING OR MULTIPLE SEALING FEATURE

(71) Applicant: Helen of Troy Limited, St. Michael (BB)

(72) Inventors: Vicente Valderrama, Staten Island, NY (US); Noah Pentelovitch, New York, NY (US)

(73) Assignee: Helen of Troy Limited, St. Michael (BB)

( * ) Notice: Subject to any disclaimer, the term of this patent is extended or adjusted under 35 U.S.C. 154(b) by 245 days.

(21) Appl. No.: 16/819,784

(22) Filed: Mar. 16, 2020

(65) Prior Publication Data

US 2021/0284398 A1 Sep. 16, 2021

(51) Int. Cl.
*B65D 43/02* (2006.01)
*B65D 53/02* (2006.01)
*B65D 81/32* (2006.01)

(52) U.S. Cl.
CPC ......... *B65D 43/0212* (2013.01); *B65D 53/02* (2013.01); *B65D 81/3216* (2013.01);
(Continued)

(58) Field of Classification Search
CPC .. B65D 43/0212; B65D 43/022; B65D 45/20; B65D 53/02; B65D 81/3216;
(Continued)

(56) References Cited

U.S. PATENT DOCUMENTS

| 1,953,765 A | * | 4/1934 | McCluney | ............ F25D 25/005 220/366.1 |
| 2,241,064 A | * | 5/1941 | Harbison | ................ A47J 47/02 220/360 |

(Continued)

FOREIGN PATENT DOCUMENTS

| JP | 3219690 | | 1/2019 | | |
| JP | 3219690 U | * | 1/2019 | ............. | A45C 11/20 |

(Continued)

OTHER PUBLICATIONS

Korean Intellectual Property Office, International Search Report issued in PCT/US2021/020770 dated Jun. 17, 2021.

*Primary Examiner* — Chun Hoi Cheung
*Assistant Examiner* — Brijesh V. Patel
(74) *Attorney, Agent, or Firm* — Rankin, Hill & Clark LLP (57) ABSTRACT

A container assembly includes a lid, a gasket connected with the lid, and a container body. The gasket includes an outer peripheral edge. The container body may include an inner surface, an upper opening defined by a peripheral top edge, and at least one discontinuity where the inner surface or the peripheral top edge deviates in shape from the outer peripheral edge of the gasket. The container assembly may also include an inner container where the gasket includes an inner edge spaced inwardly from the outer peripheral edge. The inner container includes a top opening defined by a peripheral upper edge, and is receivable in the container body. The outer peripheral edge of the gasket seals against (Continued)

an inner surface of the container body and the inner edge of the gasket seals against an internal surface or the peripheral upper edge of the inner container.

17 Claims, 6 Drawing Sheets

(52) U.S. Cl.
CPC .............. *B65D 2543/00203* (2013.01); *B65D 2543/00574* (2013.01); *B65D 2543/00972* (2013.01)

(58) Field of Classification Search
CPC ........... B65D 2543/00203; B65D 2543/00574; B65D 2543/00972; B65D 2543/00296; B65D 2543/00564; A47J 47/06
USPC ....... 220/23.83, 23.87–23.89, 326, 788, 324, 220/367.1, 784, 240, 315, 806, 345.6, 378
See application file for complete search history.

(56) References Cited

U.S. PATENT DOCUMENTS

| | | | |
|---|---|---|---|
| 3,262,602 A | 7/1966 | McConnell | |
| 3,381,872 A | 5/1968 | Holder et al. | |
| 3,433,379 A | 3/1969 | Moldavsky et al. | |
| 3,559,843 A | 2/1971 | Kern | |
| 3,613,938 A * | 10/1971 | Westcott | B65D 51/1666 220/366.1 |
| 3,677,430 A | 7/1972 | Yates, Jr. | |
| 3,895,736 A | 7/1975 | Swett | |
| 4,058,214 A * | 11/1977 | Mancuso | B65D 81/3816 426/118 |
| 4,234,100 A | 11/1980 | Chabot | |
| 4,471,880 A | 9/1984 | Taylor et al. | |
| 4,494,674 A * | 1/1985 | Roof | B65D 43/0212 220/795 |
| 4,576,309 A * | 3/1986 | Tzifkansky | A47G 19/26 220/360 |
| 4,600,117 A * | 7/1986 | Tzifkansky | B65D 51/1627 220/360 |
| 4,760,936 A | 8/1988 | Mueller | |
| 4,807,776 A * | 2/1989 | Cortopassi | B65D 43/0212 220/528 |
| 4,819,824 A * | 4/1989 | Longbottom | B65D 43/0206 D7/629 |
| 4,883,195 A * | 11/1989 | Ott | B65D 51/1627 220/366.1 |
| 5,025,948 A | 6/1991 | Fixon | |
| 5,090,572 A * | 2/1992 | DeRoseau | B65D 81/3216 206/541 |
| 5,147,059 A | 9/1992 | Olsen et al. | |
| 5,356,026 A * | 10/1994 | Andress | B65D 21/0233 206/508 |
| 5,411,160 A * | 5/1995 | Goulet | B65D 43/0212 220/780 |
| 5,579,946 A * | 12/1996 | Rowan | A47J 41/0072 220/592.27 |
| 5,704,485 A * | 1/1998 | Cautereels | F25D 3/08 206/541 |
| 5,944,211 A * | 8/1999 | Woodnorth | B65D 81/2038 220/806 |
| 5,960,979 A * | 10/1999 | Van Den Brink | B65D 43/0212 220/780 |
| 6,729,472 B2 * | 5/2004 | Stucke | B65D 51/249 220/23.88 |
| 6,793,096 B1 * | 9/2004 | Seok | B65D 43/0218 220/780 |
| 7,017,775 B2 | 3/2006 | Zettle et al. | |
| 7,090,089 B2 * | 8/2006 | Lown | B65D 43/0218 220/780 |
| 7,097,067 B2 | 8/2006 | Scarabelli et al. | |
| 7,255,228 B2 * | 8/2007 | Kim | A45C 11/00 206/320 |
| 7,299,941 B2 * | 11/2007 | McMahon, III | B65D 79/0087 220/780 |
| D580,218 S * | 11/2008 | Kim | B65D 43/022 D7/391 |
| 8,267,278 B2 | 9/2012 | Tucker et al. | |
| 8,322,553 B2 | 12/2012 | Rider, Jr. et al. | |
| 8,376,176 B2 * | 2/2013 | Dengel | B65D 43/0212 215/47 |
| 8,459,486 B2 * | 6/2013 | Luburic | B65D 41/32 220/780 |
| 8,534,492 B2 * | 9/2013 | Smyers | B65D 45/20 220/240 |
| 8,596,492 B2 * | 12/2013 | Lown | B65D 43/0212 220/788 |
| 8,678,230 B2 * | 3/2014 | Smyers | B29D 99/0096 220/784 |
| 8,714,394 B2 * | 5/2014 | Wulf | B65D 43/02 220/784 |
| 8,733,550 B2 * | 5/2014 | Harvey | B65D 41/16 206/508 |
| 8,875,927 B2 | 11/2014 | Pohlman et al. | |
| 9,340,331 B2 * | 5/2016 | Shimono | B65D 43/0229 |
| 9,637,281 B2 * | 5/2017 | Koo | B65D 43/12 |
| 10,173,826 B2 | 1/2019 | Sexton et al. | |
| 2002/0148846 A1 | 10/2002 | Luburic | |
| 2003/0116572 A1 * | 6/2003 | Klock | B65D 51/1683 220/373 |
| 2004/0084464 A1 * | 5/2004 | Koo | B65D 45/18 220/784 |
| 2005/0006390 A1 * | 1/2005 | Wang | B65D 45/30 220/326 |
| 2005/0035125 A1 * | 2/2005 | Bae | B65D 45/20 220/784 |
| 2005/0051549 A1 * | 3/2005 | Nelson | B65D 81/3216 220/23.83 |
| 2005/0139604 A1 * | 6/2005 | Kim | B65D 43/0218 220/326 |
| 2008/0073368 A1 | 3/2008 | Custer et al. | |
| 2008/0110911 A1 * | 5/2008 | Chen | B65D 45/32 220/793 |
| 2009/0026205 A1 * | 1/2009 | Moon | B65D 43/022 220/378 |
| 2009/0173656 A1 * | 7/2009 | Furlong | B65D 21/0233 206/508 |
| 2009/0200301 A1 * | 8/2009 | Beekman | B65D 81/3216 220/4.27 |
| 2010/0147846 A1 * | 6/2010 | Soibel | B65D 51/16 220/377 |
| 2010/0200588 A1 * | 8/2010 | Bergman | B65D 81/2038 220/203.01 |
| 2012/0024856 A1 * | 2/2012 | Smyers | A47G 19/02 220/345.6 |
| 2013/0024468 A1 * | 1/2013 | Kocsis | B65D 53/00 220/23.88 |
| 2013/0233854 A1 * | 9/2013 | Smyers | B65D 45/18 220/240 |
| 2014/0312108 A1 * | 10/2014 | Kroll | B65D 51/1627 229/120 |
| 2015/0166232 A1 * | 6/2015 | Lee | B65D 81/20 220/315 |
| 2017/0096274 A1 | 4/2017 | Albrecht et al. | |
| 2018/0265267 A1 | 9/2018 | Arenas et al. | |
| 2019/0047753 A1 * | 2/2019 | Koo | B65D 43/0212 |
| 2019/0112105 A1 * | 4/2019 | Lubbe | B65D 81/3216 |
| 2019/0375551 A1 * | 12/2019 | Bell | B65D 21/0222 |

FOREIGN PATENT DOCUMENTS

| | | | |
|---|---|---|---|
| KR | 2020100005310 | | 5/2010 |
| KR | 20140062397 A | * | 5/2014 |
| KR | 1020140062397 | | 5/2014 |
| NO | 2019-079735 | | 4/2019 |

(56) References Cited

FOREIGN PATENT DOCUMENTS

| WO | 98/05568 | 2/1998 |
| WO | 2018/145166 | 8/2018 |

\* cited by examiner

CONTAINER WITH VENTING OR MULTIPLE SEALING FEATURE

BACKGROUND

For a food storage container, a liquid-tight or air-tight seal between a removable lid and a container body is desirable to prevent spills and to maintain freshness of the food within the container. Some food storage containers include a wiper seal to provide an air-tight or leak-proof seal area. The wiper seal typically is positioned around the perimeter of the removable lid and presses against an inner surface of the container body as the lid is being pressed onto the container body. This can result in a buildup of air pressure inside the container body as the removable lid is pushed onto the container body, which can make it difficult to properly seal the removable lid to the container body.

U.S. Pat. No. 10,173,826 B1 discloses a container that includes a container body and a removable lid having a flexible sealing lip and venting apertures provided in the removable lid. Latches connect with the removable lid and rotate between unlatched positions, where sealing portions of the latches lift off of the removable lid thereby uncovering the venting apertures, and latched positions where the sealing portions cover the venting apertures.

Other types of seals may also be used. WO 2018/145166 A1 discloses a vertical seal provided on a removable lid that engages with a container base to provide a sealing fit. A venting slot is provided in a top edge within a clip cut-out of the container base and is also disclosed as possibly being formed within a clip niche of the removable lid. Clips are mounted to the container base and rotate between an engaged position where the clip engages the lid in the clip niche covering the venting slot preventing removal of the lid, and a disengaged position where the clip is disengaged from the lid to allow the lid to be freely removed.

SUMMARY

In view of the foregoing, a container assembly includes a lid, a gasket connected with the lid, and a container body. The gasket includes an outer peripheral edge. The container body includes an inner surface, an upper opening defined by a peripheral top edge, and at least one discontinuity where the inner surface or the peripheral top edge deviates in shape from the outer peripheral edge of the gasket. As the lid with the gasket connected to it is pressed onto the container body, air from an interior of the container body is allowed to escape through or adjacent to the at least one discontinuity until after the outer peripheral edge of the gasket passes beyond the discontinuity and seals against the inner surface of the container body. The container body further includes an upper surface around the upper opening extending outwardly from the peripheral top edge. The upper surface includes an offset surface portion offset vertically from a lower surface of the lid when the lid is connected with the base covering the upper opening. This allows for a user's fingers to be inserted between the offset surface portion and the lower surface of the lid to facilitate removal of the lid.

Alternatively, a container assembly includes a lid, a gasket connected with the lid, at least one latch connected with the lid, and a container body. The gasket includes an outer peripheral edge. The at least one latch is movable with respect to the lid. The container body includes an inner surface, an upper opening defined by a peripheral top edge, and at least one discontinuity where the inner surface or the peripheral top edge deviates in shape from the outer peripheral edge of the gasket. As the lid with the gasket connected to it is pressed onto the container body, air from an interior of the container body is allowed to escape through or adjacent to the at least one discontinuity until after the outer peripheral edge of the gasket passes beyond the discontinuity and seals against the inner surface of the container body. The at least one latch is offset from the at least one discontinuity such that the at least one latch does not cover an entirety of the at least one discontinuity as the lid with the gasket connected to it is pressed onto the container body toward the sealed position.

In another alternative, a container assembly includes a lid, a gasket connected with the lid, a container body, and an inner container. The gasket includes an outer peripheral edge and an inner edge spaced inwardly from the outer peripheral edge. The container body includes an upper opening defined by a peripheral top edge. The inner container includes a top opening defined by a peripheral upper edge. The inner container is receivable in the container body. The outer peripheral edge of the gasket seals against an inner surface of the container body and the inner edge of the gasket seals against an internal surface or the peripheral upper edge of the inner container when the inner container is received in the container body and the lid is secured to the container body.

DETAILED DESCRIPTION

Figure 1:
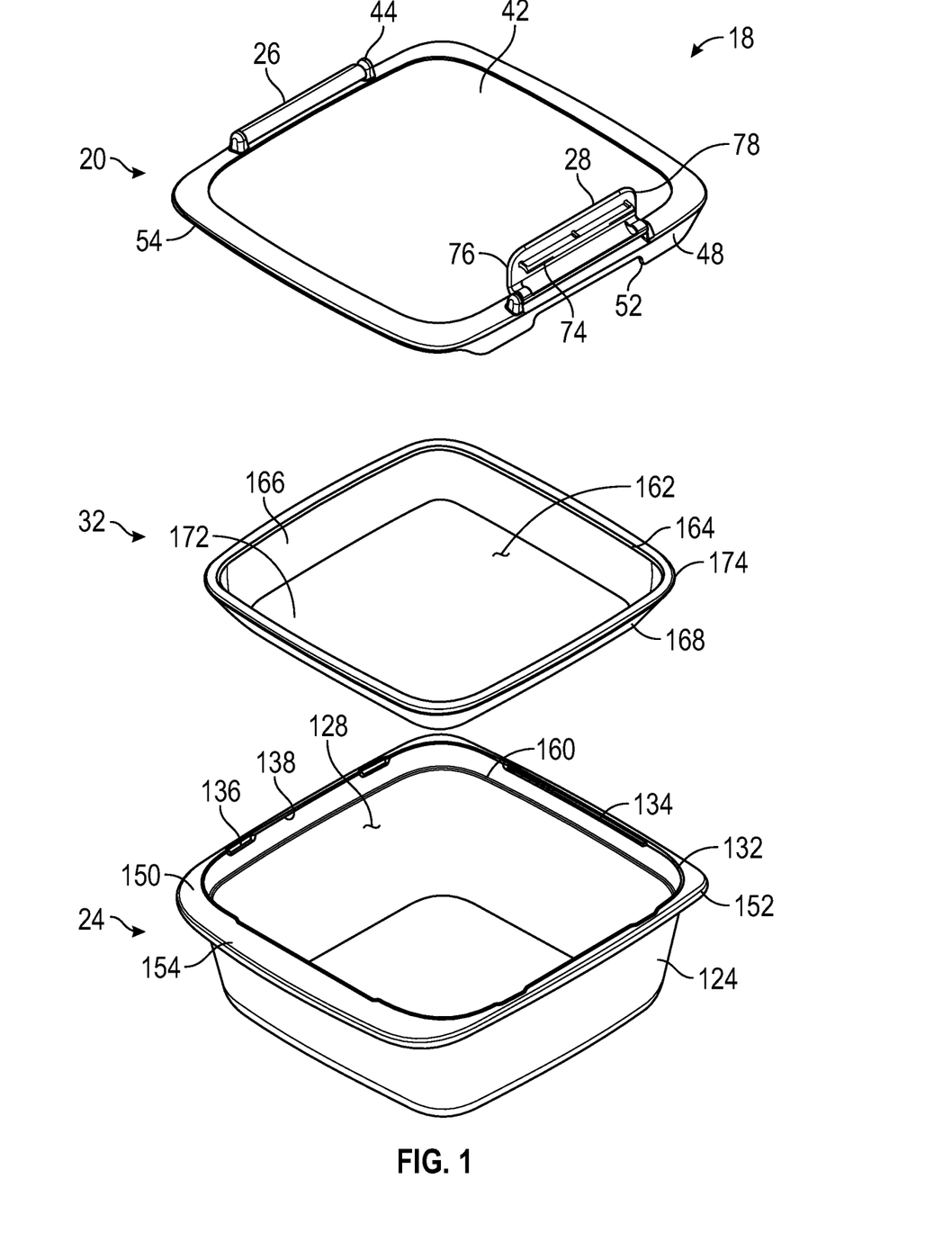
FIG. 1 is an exploded view of a container assembly.
Figure 2:
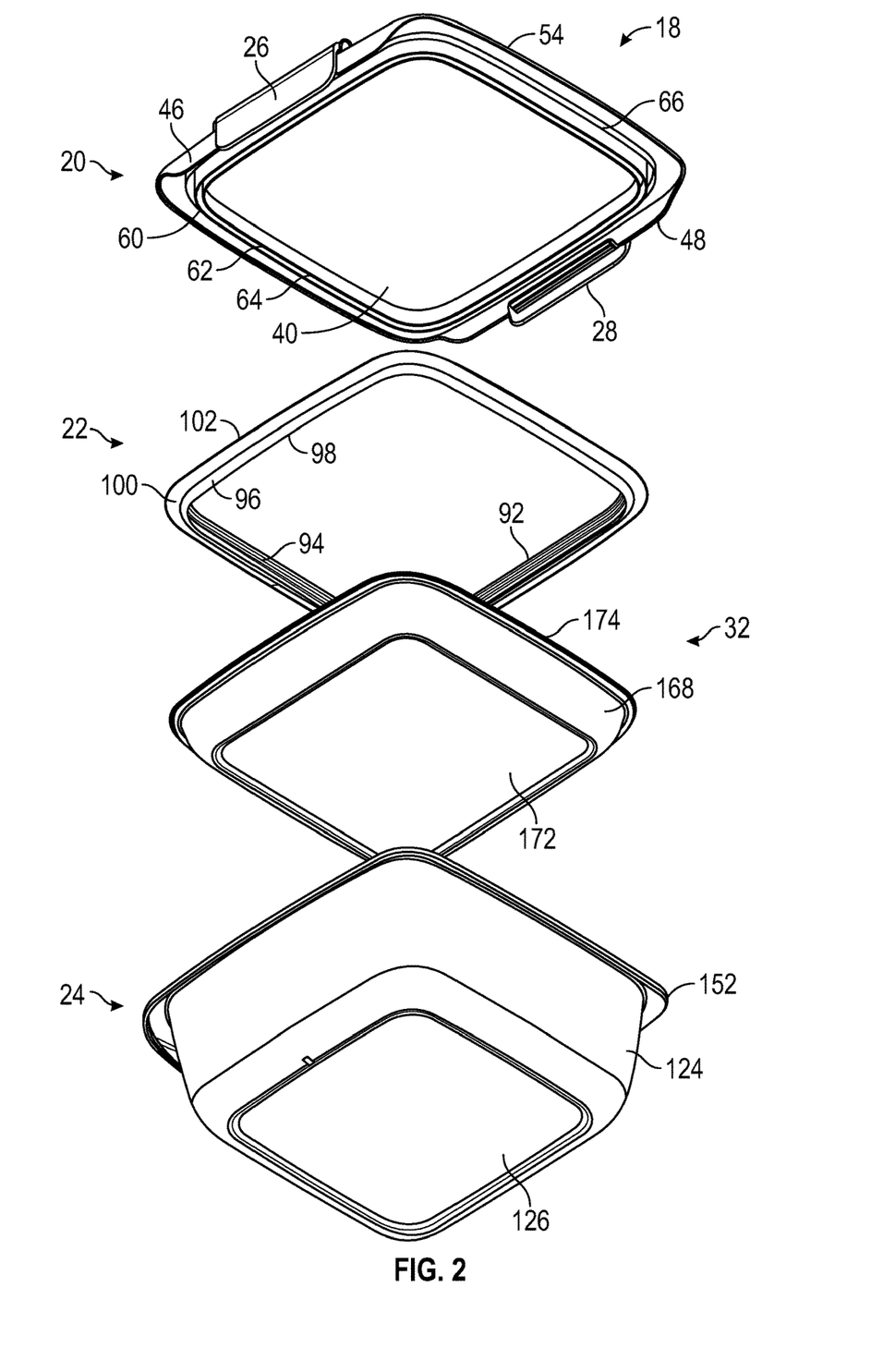
FIG. 2 is another exploded view of the container assembly.

With reference to FIGS. 1 and 2, a container assembly 18 is shown as including a lid 20, a gasket 22 (see FIG. 2), and a container body 24. The container assembly 18 is shown as including at least one latch; two latches 26, 28 are in the illustrated embodiment. The container assembly 18 can further include an inner container 32 that is receivable in the container body (see FIGS. 3 and 4). The inner container 32 can be useful in storing items such as salad and can separate the items in the inner container 32 from items in the container body 24 although the inner container 32 need not be provided with the lid 20, the gasket 22 and the container body 24. The lid 20 with the gasket 22 connected to it is pressed onto the container body 24 so as to provide an air-tight or liquid-tight seal, and the latches 26, 28 cooperate with the container body 24 to retain the lid 20 against the container body 24.

The lid 20, which is made from a rigid plastic material in the illustrated embodiment, has a lower surface 40 that faces toward the container body 24 when the lid 20 is attached to the container body 24 and an upper surface 42 facing away from the lower surface 40. With reference to FIG. 1, latch mounts 44, of which four are depicted in the illustrated embodiment, extend upwardly from the upper surface 42 to provide for a connection between each latch 26, 28 and the lid 20. The lid 20 also includes downwardly depending side flanges 46, 48 located on opposite sides of the lid 20 and on the same side of the lid 20 as the respective latches 26, 28. Each downwardly depending side flange 46, 48 includes a recess, the recess 52 in the downwardly depending side flange 48 being the only one visible in FIG. 1, however, there is another recess in the opposite downwardly depending side flange 46. The lid 20 further includes a lid outer edge 54, and the downwardly depending side flanges 46, 48 extend downwardly from opposite sides of the lid outer edge 54.

With reference to FIG. 2, an outer gasket channel wall 60 and an inner gasket channel wall 62 both depend downwardly from the lower surface 40. The inner gasket channel wall 62 is spaced inwardly from the outer gasket channel wall 60 to define a gasket channel 64 in which a portion of the gasket 22 is received to connect the gasket 22 with the lid 20. The lid 20 further includes two downward extensions 66, 68 (see FIG. 3) that extend downwardly from the lower surface 40 of the lid 20. The downward extensions 66, 68 do not extend downwardly from the lower surface 40 as far as the outer gasket channel wall 60 and the inner gasket channel wall 62 depend downwardly from the lower surface 40. In contrast to the outer gasket channel wall 60 and the inner gasket channel wall 62, which are both continuous around the lid 20 in the illustrated embodiment, the downward extensions 66 and 68 are provided on the sides of the lid 20 not including the latches 26, 28 and are not continuous around the lid 20.

Each latch 26, 28 is connected with the lid 20. In the illustrated embodiment, each latch 26, 28 is made from a rigid plastic material and is pivotally connected to the lid 20 via axles (not visible) that each connect with or are provided on the respective latch mounts 44.

Figure 4:
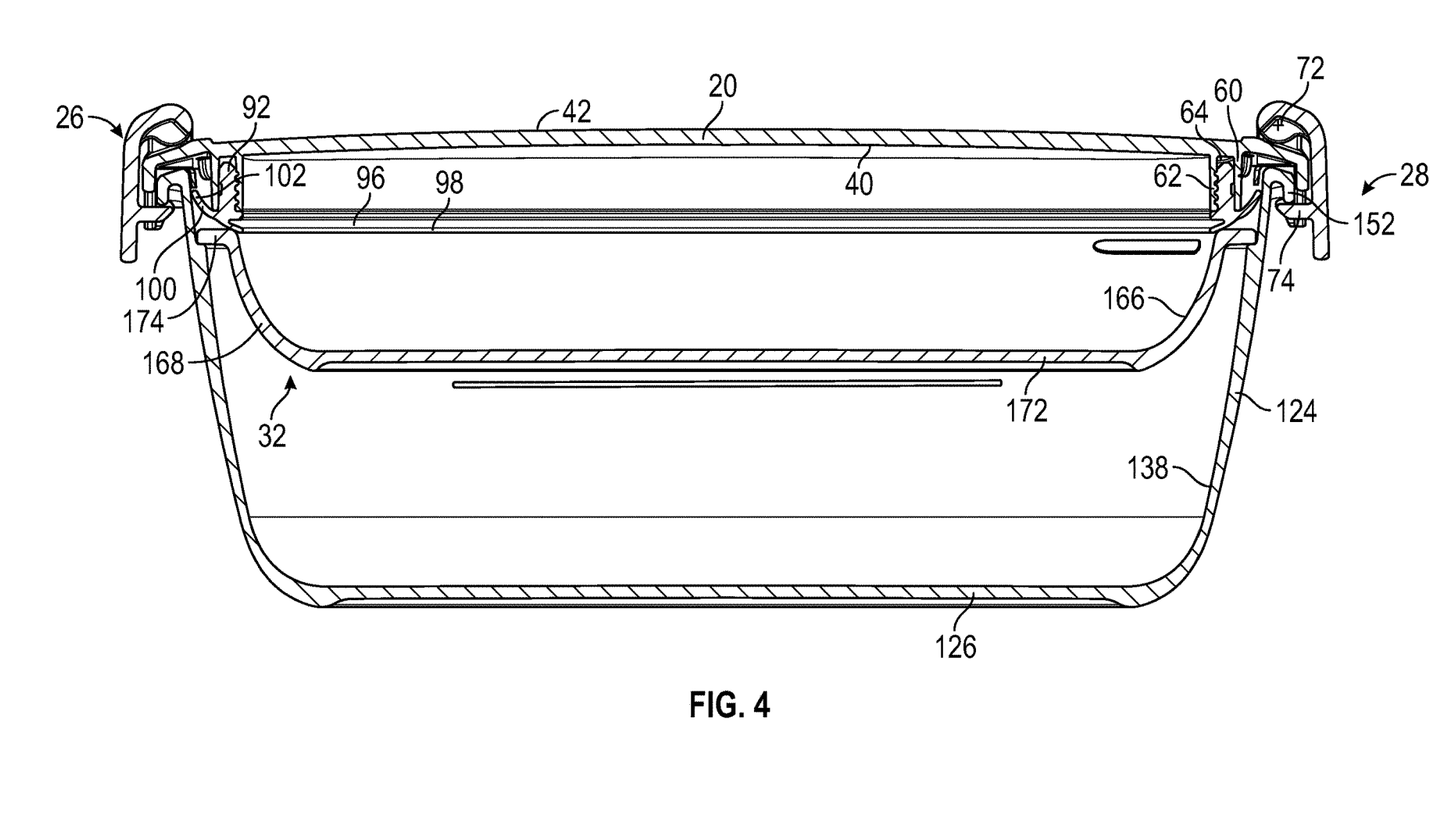
FIG. 4 is another cross-sectional view 90° rotated from the cross-sectional view depicted in FIG. 3.

The second latch 28 will be described with particularity with reference to FIGS. 1 and 4 with the understanding that the first latch 26 has the same configuration and operates in the same manner. As seen in FIG. 4, the second latch 28 pivots respect to the lid 20 about a latch pivot axis 72. The second latch 28 includes a gripping portion 74, which can be similar to a barb, configured to grip the container body 24 and secure the lid 20 to the container body when the latch occupies the latched position shown in FIG. 4. The gripping portion 74 extends through the recess 52 (FIG. 1) in the downwardly depending side flange 48 when the latch moves from an unlatched position (shown in FIG. 1) toward the latched position shown in FIG. 4. With reference to FIG. 1, the second latch 28 also includes a first lateral side 76 and a second lateral side 78 on an opposite side of the latch 28 from the first lateral side 76.

Figure 3:
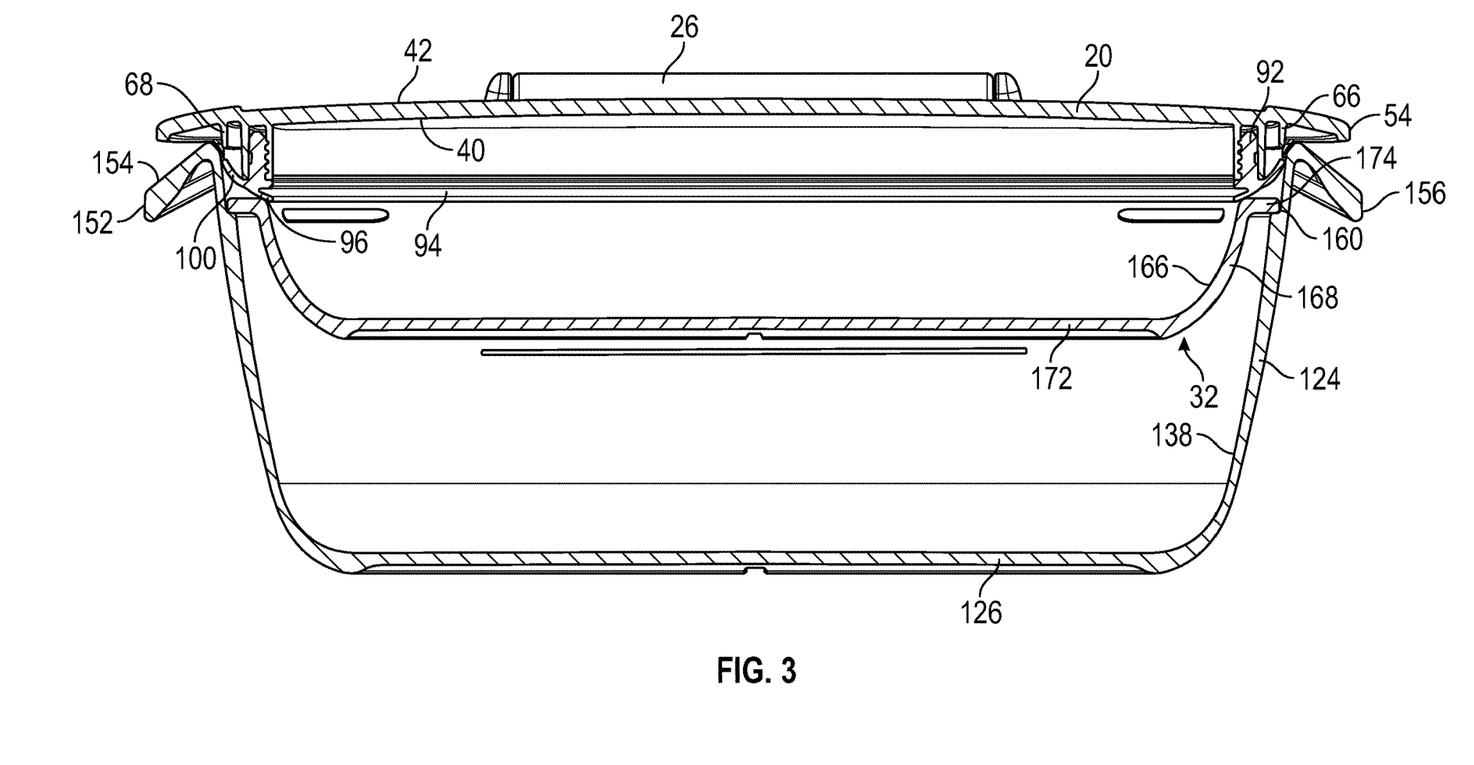
FIG. 3 is a first cross-sectional view of the container assembly depicted in FIG. 1.

The gasket 22 includes a main body 92 that is generally T-shaped in cross section (see FIGS. 3 and 4). Ridges 94 (FIG. 2) can be provided on surfaces of the main body 92 to provide a more secure attachment of the gasket 22 with the lid 20. The main body 92 is inserted into the gasket channel 64 defined between the outer gasket channel wall 60 and the inner gasket channel wall 62. With references to FIGS. 3 and 4, in the illustrated embodiment the gasket 22 includes an inner lip 96 that defines an inner edge 98 of the gasket 22 at a free end thereof. The gasket 22 further includes an outer lip 100 that defines an outer peripheral edge 102 of the gasket 22 at a free end thereof. The gasket 22 made from a flexible material such as rubber-like materials, silicone, and the like. As mentioned above, the inner container 32 need not be provided with the lid 20, the gasket 22 and the container body 24. In these instances, the gasket 22 may not include the inner lip 96 that defines the inner edge 98 of the gasket 22.

The container body 24 includes a side wall 124 that extends upwardly from a container bottom 126, which is generally planar in the illustrated embodiment. The container body 24 includes an upper opening 128 defined by a peripheral top edge 132. The container body 24 has at least one discontinuity, which in the embodiment illustrated in FIG. 1 are a plurality of notches including longer notches 134 and shorter notches 136, where the peripheral top edge 132 deviates in shape from the outer peripheral edge 102 of the gasket 22. For example, in the illustrated embodiment the outer peripheral edge 102 of the gasket 22 has a square shape with rounded corners in plan view. The peripheral top edge 132 also has the same square shape with rounded corners in plan view except for where the notches 134, 136 are provided. Both the outer peripheral edge 102 of the gasket 22 and the peripheral top edge 132 can take other matching shapes, e.g., round, rectangular, etc., but the shape and dimensions of the outer peripheral edge 102 and the peripheral top edge 132 will match but for the notches 134, 136 provided in the peripheral top edge 132 and taking into account the flexibility of the outer lip 100 of the gasket 22 as it is fit onto the container body 24.

The container body 24 also includes an inner surface 138 against which the outer peripheral edge 102 of the gasket 22 seals when the lid 20 is placed onto the container body 24. As the lid 20 with the gasket 22 connected to it is pressed onto the container body 24 air from an interior of the container body 24 is allowed to escape through to the notches 134, 136 until after the outer peripheral edge 102 of the gasket 22 passes beyond the notches 134, 136 and seals against the inner surface 138 of the container body 24.

Figure 5:
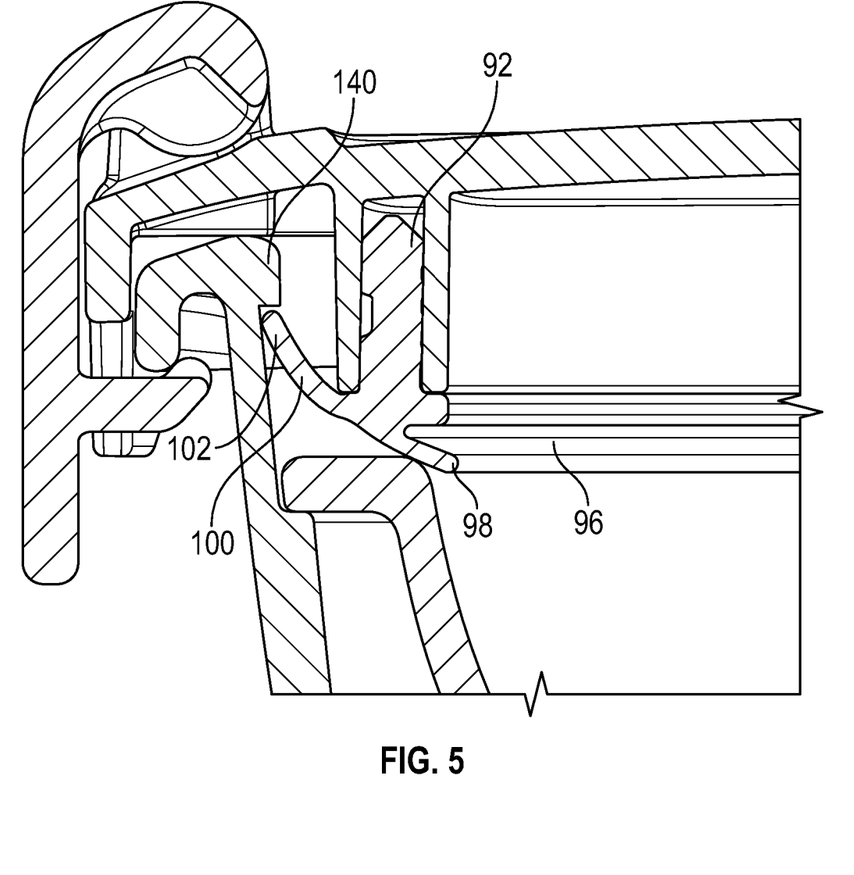
FIG. 5 is a cross-sectional view similar to FIG. 4 showing an alternative discontinuity.

With reference to FIG. 5, in place of the notches 134, 136 in the peripheral top edge 132, the container body 24 could have small bumps or protuberances 140 to provide at least one discontinuity where the peripheral top edge 132 or the inner surface 138 deviates in shape from the outer peripheral edge 102 of the gasket 22. These small bumps or protuberances 140 would extend inwardly into the interior of the container body 24 from the inner surface 138 and can be located adjacent the peripheral top edge 132. The bumps or protuberances 140 would deform the outer peripheral edge 102 of the gasket as the lid 20 with the gasket 22 connected to it is pressed onto the container body 24, thus allowing air to escape adjacent to the bumps or protuberances 140 between the inner surface 138 and the outer peripheral edge 102 of the gasket 22. The small bumps or protuberances 140 can be provided in the same locations as the notches 134, 136 shown in FIG. 1.

Figure 6:
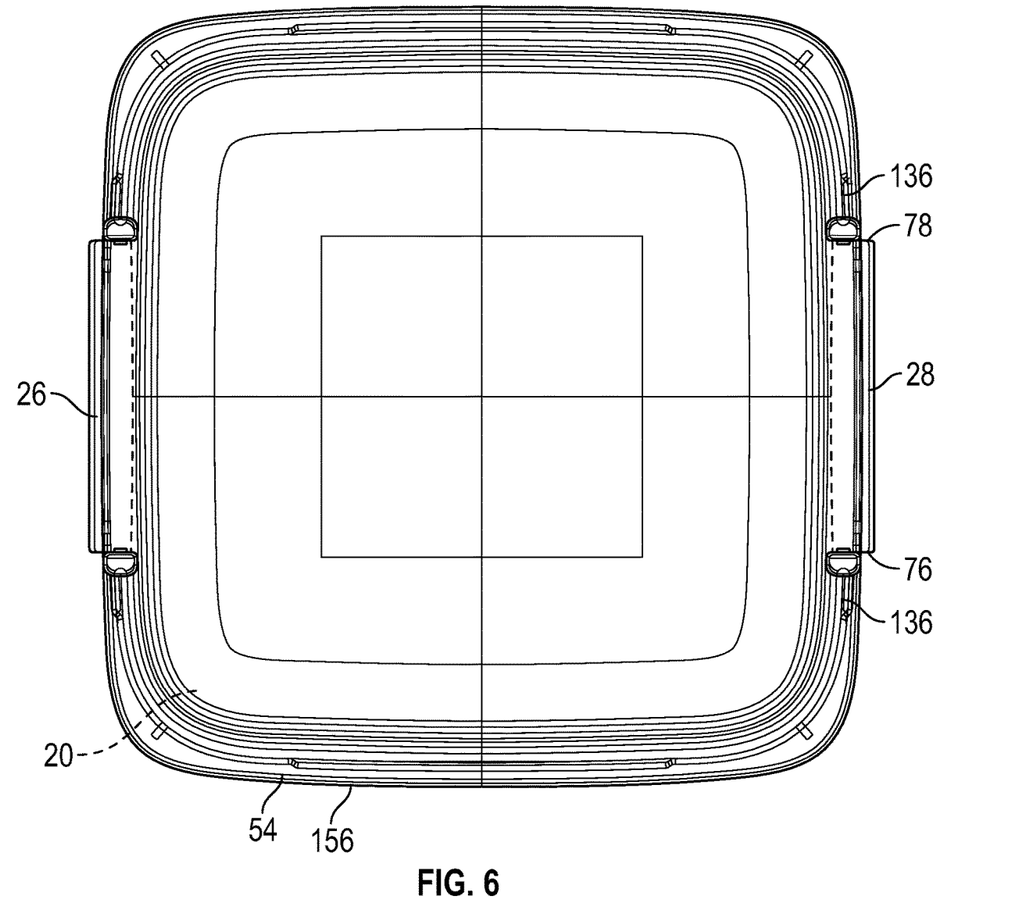
FIG. 6 is a top plan view of the container assembly with a lid being shown as transparent.

With reference back to the embodiment illustrated in FIGS. 1-4, and more particularly with reference to FIG. 6, at least a portion of one of the shorter notches 136 is offset from the first lateral side 76 of the second latch 28 and at least a portion of another of the shorter notches 136 is offset from the second lateral side 78 of the second latch 28 when the lid 20 is in the sealed position shown in FIG. 6. With reference back to FIG. 1, the shorter notches 136 are provided on opposite sides, which can be referred to as latching sides, of the peripheral top edge 132 in that the latches 26 and 28 will be disposed over these latching sides. The longer notches 134 are provided on opposite sides of the peripheral top edge 132 and can be referred to as non-latching sides of the peripheral top edge 132 where the latching sides are perpendicular to the non-latching sides. With reference to FIG. 1, the recess 52 provided in the downwardly depending side flange 48 is positioned between the two shorter notches 136 when the lid 20 is secured to the container body 24 and the second latch 28 occupies the latched position shown in FIG. 4. It is presumed that when the lid 20 is pressed onto the container body 24, the lid 20 will be handled near the latches 26, 28 and pressed down near those locations. Offsetting the shorter notches 136 from the respective latches 26, 28 may allow for an easier path for air trapped in the container body 24 to escape. As for the embodiment shown in FIG. 5, at least a portion of one of the bumps or protuberances 140 can be offset from the first lateral side 76 of the second latch 28 and at least a portion of another of the bumps or protuberances 140 can be offset from the second lateral side 78 of the second latch 28 when the lid 20 is in the sealed position. Offsetting the bumps or protuberances 140 may also allow for an easier path for air trapped in the container body 24 to escape.

The container body 24 also includes an upper surface 150 around the upper opening 128 that extends outwardly from the peripheral top edge 132. In the illustrated embodiment, the container body 24 includes an upper flange 152 extending outwardly from the peripheral top edge 132 with the upper surface 150 on the upper flange 152. With reference to FIG. 4, each latch 26, 28 engages the upper flange 152 of the container body 24 when each latch 26, 28 occupies the latched position.

As more clearly seen in FIG. 3, the upper surface 150 includes an offset surface portion 154 that is offset vertically beneath the lower surface 40 of the lid 20 to provide a space for a user to insert their fingers between the offset surface portion 154 and the lower surface of the lid 20 when the lid 20 is connected with the container body 24 covering the upper opening 128. By providing the offset surface portion 154 beneath the lower surface 40 of the lid 20, the user can insert their fingers between the lid 20 and the offset surface portion 154 so that the offset surface portion 154 could be used as leverage to remove the lid 20 from the container body 24. In the illustrated embodiment as shown in FIGS. 1 and 3, the offset surface portion 154 is an angled or curved surface that angles or curves away from the lower surface 40 of the lid 20 and from the peripheral top edge 132. In an alternative, the offset surface portion 154 could be provided as a step offsetting this surface vertically beneath the lower surface 40 of the lid 20 so as to provide a space for a user to insert their fingers between the offset surface portion 154 and the lower surface 40 of the lid 20 to facilitate removal of the lid 20. The downward extensions 66, 68 can also contact the container body 24 near the peripheral top edge 132 when the lid 20 is connected with the container body 24 covering the upper opening 128 to operate as a locating feature. Each latch 26, 28 engages the upper flange 152 of the container body 24 when each latch 26, 28 occupies the latched position on the side of the container body 24 that is perpendicular to the side from which the offset surface portion 154 extends when the lid 20 is secured to the container body 24 and each 26, 28 latch occupies the latched position. Also, the container body 24 includes an outermost peripheral edge 156, which extends outwardly beyond the lid outer edge 54 (see also FIG. 6) beneath a portion of the lid 20 overhanging the offset surface portion 154 when the lid 20 is secured to the container body 24.

The container body 24 further includes an inner ledge 160 that cooperates with the inner container 32 when the inner container 32 is received in the container body 24. The inner container 32 includes a top opening 162 defined by a peripheral upper edge 164. The inner container 32 also includes an internal surface 166 as well as a side wall 168 and an inner container bottom 172. A top flange 174 extends outwardly from the peripheral upper edge 164 for engaging with the inner ledge 160 of the container body 24 when the inner container 32 is received in the container body 24. As seen in FIGS. 3 and 4, the inner container bottom 172 of the inner container 32 is spaced from the container bottom 126 of the container body 24 when the inner container 32 is received in the container body 24. The inner edge 98 of the gasket 22 seals against the internal surface 166 and/or the peripheral upper edge 164 of the inner container 32 when the inner container 32 is received in the container body 24 and the lid 20 with the gasket connected to is secured to the container body 24. As such, both the inner container 32 and the container body 24 can be provided with a liquid-tight and/or air-tight seal when the lid 20 with the gasket connected to it is placed onto the container body 24 with the inner container 32 received in the container body 24.

A container assembly has been described above in particularity. As mentioned above, the inner container 32 need not be provided with the lid 20, the gasket 22 and the container body 24. In these instances, the gasket 22 may not include the inner lip 96 that defines the inner edge 98 of the gasket 22. Also, in another embodiment, where the inner container 32 is provided with the lid 20, the gasket 22 and the container body 24, the container body 24 may not include the aforementioned discontinuities, e.g., the notches 134, 136 or the small bumps or protuberances 140. Additionally, some elements, e.g., container body sides, have been described as perpendicular to one another. The term "perpendicular" used herein does not mean exact 90-degree intersection, but accepts a predetermined angular range (e.g., 10 degrees) around a target value of 90 degrees at least in consideration of drawings provided herein.

Modifications and alterations will occur to those upon reading and understanding the detailed description. The invention, however, is not limited to only the embodiments described above. Instead, the invention is broadly defined by the appended claims and the equivalents thereof. It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A container assembly comprising:
   a lid;
   a gasket connected with the lid, the gasket including an outer peripheral edge;
   a container body including an inner surface, an upper opening defined by a peripheral top edge, and at least one discontinuity where the inner surface or the peripheral top edge deviates in shape from the outer peripheral edge of the gasket, wherein as the lid with the gasket connected thereto is pressed onto the container body air from an interior of the container body is allowed to escape through or adjacent to the at least one discontinuity until after the outer peripheral edge of the gasket passes beyond the at least one discontinuity and seals against the inner surface of the container body;
   the container body further including an upper surface around the upper opening extending outwardly from the peripheral top edge, wherein the upper surface includes an offset surface portion offset from a lower surface of the lid when the lid is connected with the container body covering the upper opening defining a space between the offset surface portion and the lower surface of the lid configured to receive a user's finger, wherein the container body includes an outermost peripheral edge, which extends outwardly beyond a lid outer edge beneath a portion of the lid overhanging the offset surface portion when the lid is secured to the container body;

wherein the at least one discontinuity includes at least two discontinuities, wherein one of the at least two discontinuities is provided on or in the non-latching side of the container body from which the offset surface portion extends and another of the at least two discontinuities is provided on or in a latching side of the container body that is perpendicular to the non-latching side from which the offset surface portion extends; and wherein the one of the at least two discontinuities provided on or in the non-latching side from which the offset surface portion extends is longer in length than the another of the at least two discontinuities provided on or in the latching side that is perpendicular to the non-latching side from which the offset surface portion extends.

2. The container assembly of claim 1, further comprising at least one latch connected with the lid, the at least one latch being movable with respect to the lid between a latched position and an unlatched position, wherein the at least one latch engages an upper flange of the container body on the latching side that is perpendicular to the non-latching side from which the offset surface portion extends when the lid is secured to the container body and the at least one latch occupies the latched position.

3. The container assembly of claim 1, wherein the at least one discontinuity is a notch provided in the peripheral top edge.

4. The container assembly of claim 1, wherein the at least one discontinuity is a bump or protrusion extending inwardly from the peripheral top edge or the inner surface adjacent to the peripheral top edge.

5. A container assembly comprising:
a lid;
a gasket connected with the lid, the gasket including an outer peripheral edge;
at least one latch connected with the lid, the at least one latch being movable with respect to the lid; and
a container body including an inner surface, an upper opening defined by a peripheral top edge, and at least one discontinuity where the inner surface or the peripheral top edge deviates in shape from the outer peripheral edge of the gasket, wherein as the lid with the gasket connected thereto is pressed onto the container body air from an interior of the container body is allowed to escape through or adjacent to the at least one discontinuity until after the outer peripheral edge of the gasket passes beyond the at least one discontinuity and seals against the inner surface of the container body;
wherein the at least one latch includes a first lateral side and a second, opposite lateral side, at least one of the first lateral side and the second lateral side of the at least one latch is offset inwardly relative to and along a latching side of the container body from the at least one discontinuity such that the at least one latch does not cover an entirety of the at least one discontinuity as the lid with the gasket connected thereto is pressed onto the container body toward a sealed position.

6. The container assembly of claim 5, wherein the at least one discontinuity includes at least two discontinuities, wherein at least a portion of one of the at least two discontinuities is offset from the first lateral side of the at least one latch and at least a portion of another of the at least two discontinuities is offset from the second, opposite, lateral side of the at least one latch when the lid is in the sealed position.

7. The container assembly of claim 5, wherein the at least one discontinuity includes at least two discontinuities, wherein one of the at least two discontinuities is provided on or in one of the latching side and a non-latching side of the container body and another of the at least two discontinuities is provided on or in the other of the latching side and the non-latching side of the container body that is perpendicular to the one side.

8. The container assembly of claim 7, wherein the one of the at least two discontinuities provided on or in the one side of the container body is shorter in length than the another of the at least two discontinuities provided on or in the other side of the container body.

9. The container assembly of claim 5, wherein the at least one latch includes a gripping portion configured to grip the container body and secure the lid to the container body when the at least one latch occupies a latched position, wherein the lid includes a downwardly depending side flange and a recess in the downwardly depending side flange, wherein the gripping portion extends through the recess when the at least one latch moves from an unlatched position toward the latched position.

10. The container assembly of claim 9, wherein the at least one discontinuity includes at least two discontinuities on the latching side of the container body, wherein the recess is positioned between the at least two discontinuities on the latching side of the container body when the lid is secured to the container body and the at least one latch occupies the latched position.

11. The container assembly of claim 5, wherein the at least one discontinuity is a notch provided in the peripheral top edge.

12. The container assembly of claim 5, wherein the at least one discontinuity is a bump or protrusion extending inwardly from the peripheral top edge or the inner surface adjacent to the peripheral top edge.

13. A container assembly comprising:
a lid defining a gasket channel;
a gasket connected with the lid, the gasket including a main body inserted into the gasket channel, an outer lip extending from the main body and defining an outer peripheral edge at an outer free end thereof and an inner lip extending from the main body and defining an inner edge at an inner free end thereof spaced inwardly from the outer peripheral edge;
a container body including an upper opening defined by a peripheral top edge; and
an inner container including a top opening defined by a peripheral upper edge, the inner container being receivable in the container body;
wherein with the main body inserted into the gasket channel, the outer seal lip and the inner seal lip extend away from the gasket channel and are resilient movably toward the main body,
wherein the outer peripheral edge seals against an inner surface of the container body and the inner edge seals against at least one of an internal surface and the peripheral upper edge when the inner container is received in the container body and the lid is secured to the container body.

14. The container assembly of claim 13, wherein the container body includes a container body bottom spaced from the upper opening and the inner container includes an inner container bottom spaced from the top opening, wherein the inner container bottom is spaced from the container body bottom when the inner container is received in the container body.

15. The container assembly of claim 14, wherein the container body includes at least one discontinuity where the inner surface or the peripheral top edge deviates in shape from the outer peripheral edge of the gasket, wherein as the lid with the gasket connected thereto is pressed onto the container body air from an interior of the container body is allowed to escape through or adjacent to the at least one discontinuity until after the outer peripheral edge of the gasket passes beyond the at least one discontinuity and seals against the inner surface of the container body.

16. The container assembly of claim 15, wherein the at least one discontinuity is a notch provided in the peripheral top edge.

17. The container assembly of claim 15, wherein the at least one discontinuity is a bump or protrusion extending inwardly from the peripheral top edge or the inner surface adjacent to the peripheral top edge.

\* \* \* \* \*